Dec. 19, 1950 A. C. JACOBAEUS 2,534,822

CONNECTING DEVICE FOR TELEPHONE EXCHANGES USING A REGISTER

Filed Aug. 10, 1945

Inventor,

Anton Christian Jacobaeus

By Glascock Downing & Seebold

Attorneys

Patented Dec. 19, 1950

2,534,822

UNITED STATES PATENT OFFICE 2,534,822

CONNECTING DEVICE FOR TELEPHONE EXCHANGES USING A REGISTER

Anton Christian Jacobaeus, Stockholm, Sweden, assignor to Telefonaktiebolaget L M Ericsson, Stockholm, Sweden, a company of Sweden Application August 10, 1945, Serial No. 610,009
In Sweden November 17, 1944

1 Claim. (Cl. 179—16)

Figures 1, 2:
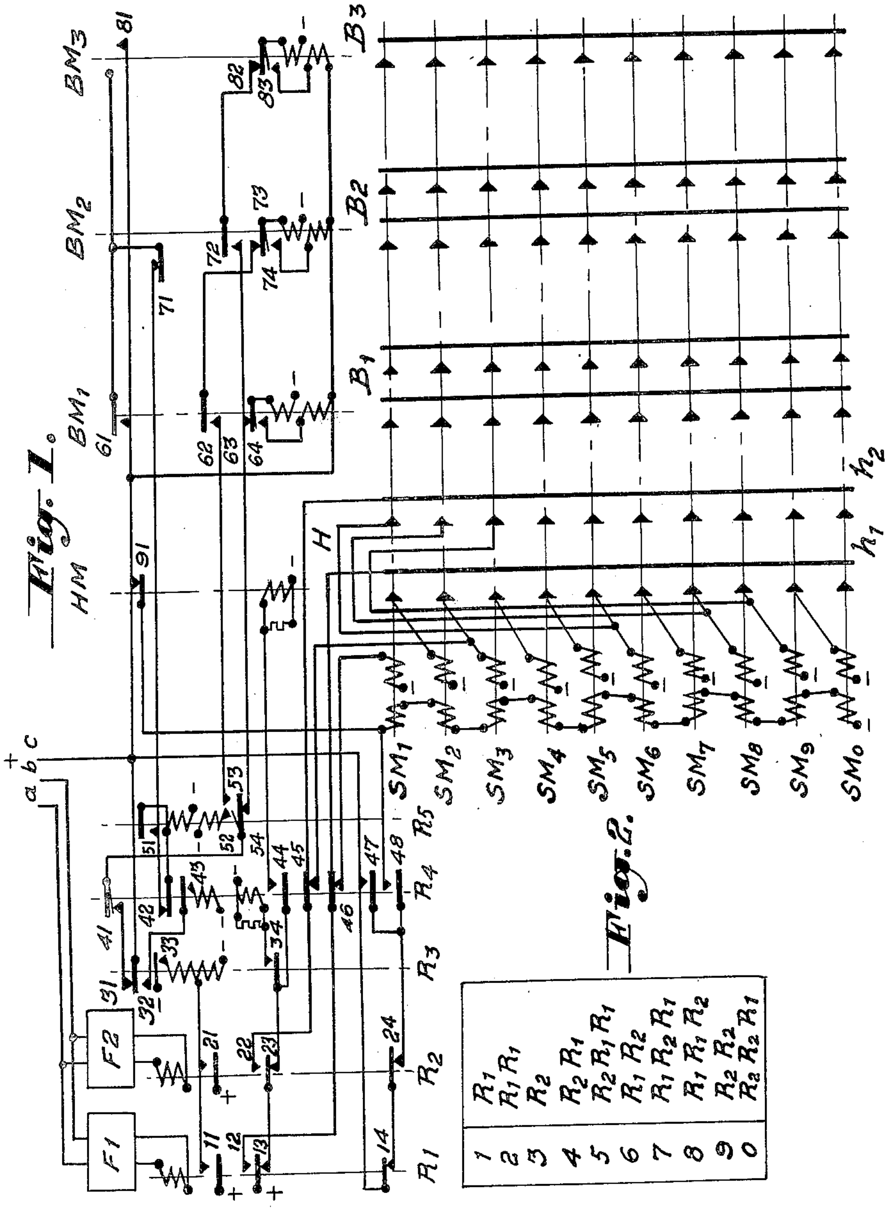

Registers are often used for transmission of the digits or characters in a telephone number from one automatic telephone exchange to another. The transmission takes place by means of impulse series, the number of impulses in an impulse series usually identifying the digit or character. Impulses of different kinds are sometimes sent in the same impulse series, shorter impulse series being used and the transmission time being thereby reduced. When dialling on long, expensive lines it is important that the impulse transmission should go quickly. If the same registers are to be used for reception of digits or characters from neighbouring exchanges as well as from remote exchanges, it may happen—especially by collaboration between old and new devices—that the same registers for certain calls will be set by impulse series containing only one kind of impulses and for other calls by impulse series consisting of impulses of two or more different kinds. The present invention has for an object to make it possible without special signals and devices being needed to indicate what kind of calls have come in.

According to the invention this is obtained by the recording means containing at the same time impulse receiving devices ready to function for both signal transmission systems, and a recording device common to both of them.

The invention will be more closely described with reference to the accompanying drawing, in which Fig. 1 is a diagram illustrating the invention and Fig. 2 is a view showing the relation between the items of the signal members and the order of operation of the impulse receiving relays.

Fig. 1 shows that part of a register, which is essential for the invention, said register being set by means of alternating current impulses, partly impulse series containing impulses with only one alternating current frequency, partly impulse series containing impulses with one of two alternating current frequencies being used. To distinguish the two alternating current frequencies one from the other there are two filters F1 and F2 and two impulse receiving relays R1 and R2. The impulses operate the selecting magnets SM1—SM0 in a cross bar switch, and the impulse series are recorded on the operating bars B1—B3 in the same. A special auxiliary operating bar H, with the operating magnet HM and the contact segments *h1* and *h2*, is used for impulsing. The operating bars B1—B3 are controlled by the operating magnets BM1—BM3.

When the register is busy with a call, the positive pole, of the exchange battery is connected to the wire *c*. We suppose first, that an impulse series containing only one alternating current frequency, which passes the filter F1 and operates the relay R1, comes in over the wires *a* and *b*. The contacts 11—14 are operated. Over contact 11 a circuit is completed for relay R3, which attracts its armature. The contacts 31—34 are operated. Contact 33 puts into service an additional winding on relay R3, which is so connected, that the relay is slow releasing and therefore remains operative during the pause between two impulses belonging to the same impulse series. The following circuit is completed over contact 12; positive, contacts 12 and 46, winding on selecting magnet SM1 to the negative pole, of the exchange battery. The selecting magnet SM1 attracts its armature. The magnet SM1 as well as all the other selecting magnets was already energized beforehand by the following circuit: positive, wire *c*, contact 91, windings on all selecting magnets SM1—SM0 to negative. In this circuit none of the selecting magnets is able to operate its armature, but after a selecting magnet has attracted its armature, said armature is held until said circuit over contact 91 is broken. After the end of the first impulse the relay R1 releases its armature and the following circuit is completed: positive, contact 13, 23 and 34 winding on relay R4 to negative. The relay R4 attracts its armature. The contacts 41—48 are operated. The relay R4 is held by a winding connected over the contacts 32 and 43. Over contact 44 the operating magnet HM receives current and attracts its armature. The contact 91 is operated. The contacts corresponding to the selecting magnet SM1 in the operating bar H are closed. The selecting magnet SM1 is held in the following circuit: positive, wire *c*, contacts 14, 24 and 48, windings on SM1—SM0 to negative. On the next impulse the following circuit is completed: positive, contact 12, the contact corresponding to selecting magnet SM1 on segment *h1*, winding on selecting bar SM2 to negative. The selecting magnet SM2 attracts its armature. When contacts 13 and 14 are broken, the magnets SM1 and HM release their armatures. The magnet HM is somewhat slow at release, owing to the provision of a parallel resistance, so as to allow magnet SM2 with certainty to attract its armature. When contact 91 closes again, the magnet SM2 is held. Contact 91 closes before the contacts of the operating bar are opened, when magnet HM releases its armature. After the second impulse the operating magnet HM is attracted again, the contacts corresponding to the selecting magnet SM2 in the operating bar H being closed. In this way the selecting magnets are operated one after the other, and at the end of the impulse series the armature is attracted by the selecting magnet, that was operated last, and is held by the circuit over contacts 14, 24 and 48.

After the impulse series the relay R3 releases its armature. Relay R4 is somewhat slow to release, hence the following circuit is completed: positive, wire *c*, contacts 31, 41, 54 and 63, winding on operating magnet BM1 to negative. The magnet BM1 attracts its armature and the contacts 61—64 are operated. The magnet BM1 is self held over contact 64 and an auxiliary winding, which has for an object to reduce the current-consumption. The contacts corresponding to the last operated selecting magnet on the operating bar B1 are closed. Hereafter relay R4 releases its armature and the following circuit is completed: positive, wire *c*, contacts 61, 71 and 42, winding on relay R5 to negative. The relay R5 attracts its armature and the contacts 51—54 are operated. When the contacts 44 and 48 opened, the last operated selecting magnet and the operating magnet HM released their armatures, thereafter the register is ready to receive a new impulse series.

By way of example and to show the usefulness of the invention it is supposed that the other impulse series coming in over the wires *a* and *b* is composed of impulses of two kinds and corresponding to the digit or character 7. Fig. 2 is a a table or index showing the order in which the impulse relays R1 and R2 are operated in accordance with the several digits of the telephone number. According to the table the digit 7 of the telephone number corresponds with one impulse on relay R1, one impulse on relay R2 and a second impulse from relay R1. Further, it appears on Fig. 2 that never more than three impulses are needed for any digit or character. The transmission of a number of digits or characters will therefore take place considerably more quickly than by impulse emission with only one kind of impulse.

By the first impulse in the second impulse series the relays R1 and R3 and the selecting magnet SM1 attract in conformity to the description above. The fact that relay R5 and operating magnet BM1 have attracted their armatures does not influence said progress. After the end of the impulse, relay R4 and operating magnet HM attract their armatures. At the beginning of the second impulse, relay R2 attracts its armature and magnets SM1 and HM release their armatures according to the description above. During the release time for magnet HM the following circuit is completed: positive, contacts 13, 22 and the contact corresponding to magnet SM1 on segment *h*2, winding on selecting magnet SM6 to negative. The magnet SM6 attracts its armature. At the end of the second impulse the magnet HM attracts again and the contacts corresponding to magnet SM6 on the operating bar HM are closed. At the beginning of the third impulse relay R1 attracts its armature and the following circuit is completed: positive, contact 12, the contact corresponding to selecting magnet SM6 on segment *h*1, winding on selecting magnet SM7 to negative. The selecting magnet SM7 attracts its armature, selecting magnet SM6 releases its armature and operating magnet HM releases its armature, after which selecting magnet SM7 is held with current over contact 91.

After the end of the third impulse the relay R, and thereafter the relay R3, release their armatures. Since the relay R5 has now attracted its armature owing to the preceding impulse series, the following circuit is completed: positive, contacts 31, 41, 53, 62 and 73, winding on operating magnet BM2 to negative. The relay R5 is held over contact 52, operating magnet BM2 attracts its armature, contacts 71—74 are operated and the contacts corresponding to selecting magnet SM7 on the operating bar B2 are closed. The operating magnet BM2 is self held by means of contact 74 and an auxiliary winding. The second impulse series is thus registered on the operating bar B2. When relay R4 releases its armature, contact 41 opens and, as now the holding circuit for relay R5 is broken by contact 71, the relay R5 releases its armature.

Thereafter the operating magnet BM3 is ready to receive a third impulse, contacts 81, 82 and 83 functioning in the same way as 61, 63 and 64, respectively.

The third impulse series may of course, as appears from the description above, be composed of impulses of only one kind or of impulses of two different kinds. The filters F1 and F2 for the impulse receiving relays R1 and R2 need not be placed in the register, but may pertain to the equipment for a junction line, for example, where even other impulse receiving relays may exist, which repeat the impulses to the relays R1 and R2 over the wires *a* and *b* by means of direct current signals, a wire for each relay being then disposed of.

I claim:

In a telephone system of the type in which both code impulse series and normal impulse series may appear on the same line, a register, two impulse relays in said register selectively operated by impulses of two kinds appearing in an impulse series received in the register from a line connected to said register, a cross-bar switch in said register, a plurality of selecting magnets and a plurality of operating magnets in said cross-bar switch, a slow-releasing control relay connected in a circuit arranged to be closed by either of said two impulse relays when operated, said slow-releasing control relay including means holding the same actuated until the end of an impulse series, an auxilary relay connected to said control relay for actuation in the pause between the first and second impulses of an impulse series on said line, means for holding said auxiliary relay actuated until the end of each impulse series, an auxiliary operating bar in said switch and a magnet controlling said bar, an operating circuit for said magnet including contacts on said auxiliary relay and a first break contact on each of said impulse relays, whereby said magnet is released upon occurrence of each impulse, and is operated after each impulse, two rows of contacts on said operating bar, one contact in each of said rows connected with said respective selecting magnets, a circuit including a battery and a make contact on one of said impulse relays and a break contact on said auxiliary relay for operating one of said selecting magnets, another circuit including a battery and a make contact on the other of said impulse relays and another break contact on said auxiliary relay for operating another one of said selecting magnets, a second break contact on each of said impulse relays, a holding circuit common to all of said selecting magnets and including said second break contacts connected in series, a break contact on the operating magnet for said auxiliary operating bar connected in parallel to said second break contacts on each of said impulse relays, a circuit including said make contacts, a battery, a contact in one of said contact rows and a winding on one of said selecting magnets, said last-named circuit thereby being closed during each impulse except the first in said series of impulses, and means responsive to the release of said control relay for operating one of said operating magnets at the end of said impulse series.

ANTON CHRISTIAN JACOBAEUS.

REFERENCES CITED

The following references are of record in the file of this patent:

UNITED STATES PATENTS

| Number | Name | Date |
|---|---|---|
| 1,845,571 | Trechcinski | Feb. 16, 1932 |
| 1,886,216 | Nilsson | Nov. 1, 1932 |
| 2,303,356 | Holden | Dec. 1, 1942 |
| 2,317,191 | Holbrook | Apr. 20, 1943 |
| 2,324,394 | Holden | July 13, 1943 |